(12) United States Patent
Choi

(10) Patent No.: US 6,450,154 B1
(45) Date of Patent: Sep. 17, 2002

(54) METHOD FOR CREATING A HOMOGENEOUS FUEL CHARGE IN THE COMBUSTION CHAMBER THROUGH THE USE OF ULTRASOUND SPRAY BREAKUP

(75) Inventor: Cathy Y. Choi, Morton, IL (US)

(73) Assignee: Caterpillar, Peoria, IL (US)

( * ) Notice: Subject to any disclaimer, the term of this patent is extended or adjusted under 35 U.S.C. 154(b) by 0 days.

(21) Appl. No.: 09/970,553

(22) Filed: Oct. 4, 2001

(51) Int. Cl.$^7$ ............................................... F02M 27/08
(52) U.S. Cl. ................. 123/536; 123/48 A; 123/48 AA
(58) Field of Search ................. 123/536, 537, 123/538, 48 A, 48 AA

(56) References Cited

U.S. PATENT DOCUMENTS

| | | |
|---|---|---|
| 3,677,236 A | 7/1972 | Moss |
| 3,977,604 A | 8/1976 | Yokoyama et al. |
| 4,029,064 A | 6/1977 | Csaszar et al. |
| 4,123,481 A | 10/1978 | Herold et al. |
| 4,227,817 A | 10/1980 | Gerry |
| 4,255,965 A * | 3/1981 | Schulz et al. ................... 73/35 |
| 4,338,905 A * | 7/1982 | Urich ........................... 123/536 |
| 4,344,404 A * | 8/1982 | Child et al. .................. 123/538 |
| 4,389,999 A * | 6/1983 | Jaqua .......................... 123/536 |
| 4,474,326 A * | 10/1984 | Takahashi .................... 239/102 |
| 4,576,136 A | 3/1986 | Yamauchi et al. |
| 4,860,711 A * | 8/1989 | Morikawa ................. 123/48 A |
| 5,026,167 A | 6/1991 | Berliner, III |
| 5,027,764 A * | 7/1991 | Reimann ..................... 123/536 |
| 5,179,923 A | 1/1993 | Tsurutani et al. |
| 5,564,402 A | 10/1996 | Pöschl |
| 6,065,454 A * | 5/2000 | Schock et al. .............. 123/537 |
| 6,260,520 B1 * | 7/2001 | Van Reatherford ..... 123/48 AA |

* cited by examiner

Primary Examiner—Marguerite McMahon
(74) Attorney, Agent, or Firm—Todd Taylor

(57) ABSTRACT

An engine particularly suitable for homogeneous charge compression ignition operation. A piezoelectric oscillator is provided in a combustion chamber of the engine and initiates ultrasonic pressure waves to promote the breakup of fuel droplets. The piezoelectric oscillator can be mounted on a crown of a piston, or on a cylinder head.

21 Claims, 2 Drawing Sheets

METHOD FOR CREATING A HOMOGENEOUS FUEL CHARGE IN THE COMBUSTION CHAMBER THROUGH THE USE OF ULTRASOUND SPRAY BREAKUP

TECHNICAL FIELD

The present invention relates generally to the field of internal combustion engines and fuel systems therefor, and more specifically to engines operated under homogenous charge compression ignition principles.

BACKGROUND

It has been known for many years to use spark ignition, or direct injection ignition concepts in internal combustion engines. In the spark ignition design, a mixture of fuel and air is introduced into a combustion cylinder and compressed. A spark plug initiates combustion through the creation of an open spark sufficient to ignite the air and fuel mixture in the cylinder. In direct injection ignition engines, fuel is injected into the already compressed combustion air in the combustion chamber. The heat generated in the compressed air during compression, causes the fuel to ignite. Both two and four stroke operating sequences are known for each spark ignition and direct injection ignition engines.

Increasingly restrictive engine emission standards have led to the investigation of engine operating and compression ignition alternatives. In one such alternative, referred to as homogenous charge compression ignition (HCCI), significant emission reductions have been experienced during initial testing. In an engine operating under HCCI concepts, the fuel is introduced into the cylinder earlier in the compression cycle than for a direct injection ignition engine. The air and fuel are intimately mixed, typically at a high air/fuel ratio, before maximum compression in the combustion cylinder. As a result, each droplet of fuel is surrounded by an excess amount of combustion air, as much as twice the air required for combustion, supporting more complete combustion of the fuel. As compression occurs, the air temperature increases, and ultimately combustion is initiated at numerous locations throughout the cylinder, as the fuel droplets auto-ignite from the heat of the surrounding air. Typically, combustion commences at lower temperatures than for direct charge ignition, leading to reduced NOx emissions.

The use of homogenous charge compression ignition concepts has apparent benefits in substantial reduction of NOx emissions. However, difficulties have been encountered in implementing the HCCI concepts. Fuel preparation is important for peak operating performance of an HCCI engine. The air/fuel mixture must be intimately and thoroughly mixed. Preferably, fuel breakup occurs early in the compression cycle, allowing for intimate mixture of the air and fuel. It is desirable to create droplets of fuel as small as possible in a combustion cylinder operating under HCCI concepts. High pressure injection of the fuel can be used to create surface instabilities on the fuel droplets, causing the fuel spray to breakup and disperse. However, the effectiveness of high pressure fuel injection in creating the smallest possible fuel droplets has been somewhat limited.

It is known to use ultrasonic vibrators in fuel supply systems to atomize fuel prior to introduction of the fuel into a combustion chamber. Commonly, such systems employ chambers or devices for atomizing fuel upstream of the combustion chamber.

U.S. Pat. No. 3,977,608 entitled, "Fuel Injection Nozzle Assembly" discloses a fuel injection nozzle having an egg-shaped housing, with a disc shaped ultrasonic vibrator facing auxiliary nozzles, and a ring-shaped vibrator at the throat of the main jet nozzle. The nozzle assembly is capable of atomizing a variety of fuels, oxidizers and water prior to introduction of the fluids to the combustion chamber.

The present invention is directed to overcoming one or more of the problems as set forth above.

SUMMARY OF THE INVENTION

In one aspect of the invention, an internal combustion engine is provided with an engine block defining therein a combustion cylinder, and a primary piston disposed in the combustion cylinder. A piezoelectric oscillator is disposed in the cylinder. The piezoelectric oscillator is connected to a voltage source.

In another aspect of the invention, a method for operating an engine is provided with steps of providing a combustion cylinder having a cylinder head at an end thereof and a primary piston reciprocally disposed in the combustion cylinder, defining a combustion chamber; providing a piezoelectric oscillator in the combustion chamber; introducing fuel into the combustion chamber; activating the piezoelectric oscillator and initiating waves of ultrasonic energy through the combustion chamber and the fuel in the combustion chamber; dispersing the fuel throughout the combustion chamber; and compressing the fuel in the combustion chamber.

In a further aspect of the invention, a work machine is provided with a machine frame and an engine carried by the machine frame. The engine includes an engine block defining therein a combustion cylinder, a primary piston disposed in the combustion cylinder, and a cylinder head defining an end of the combustion cylinder. The cylinder head defines a secondary cylinder in flow communication with the combustion cylinder. A secondary piston is reciprocally disposed in the secondary cylinder. A piezoelectric oscillator is disposed in the combustion chamber.

DETAILED DESCRIPTION

Figure 1:
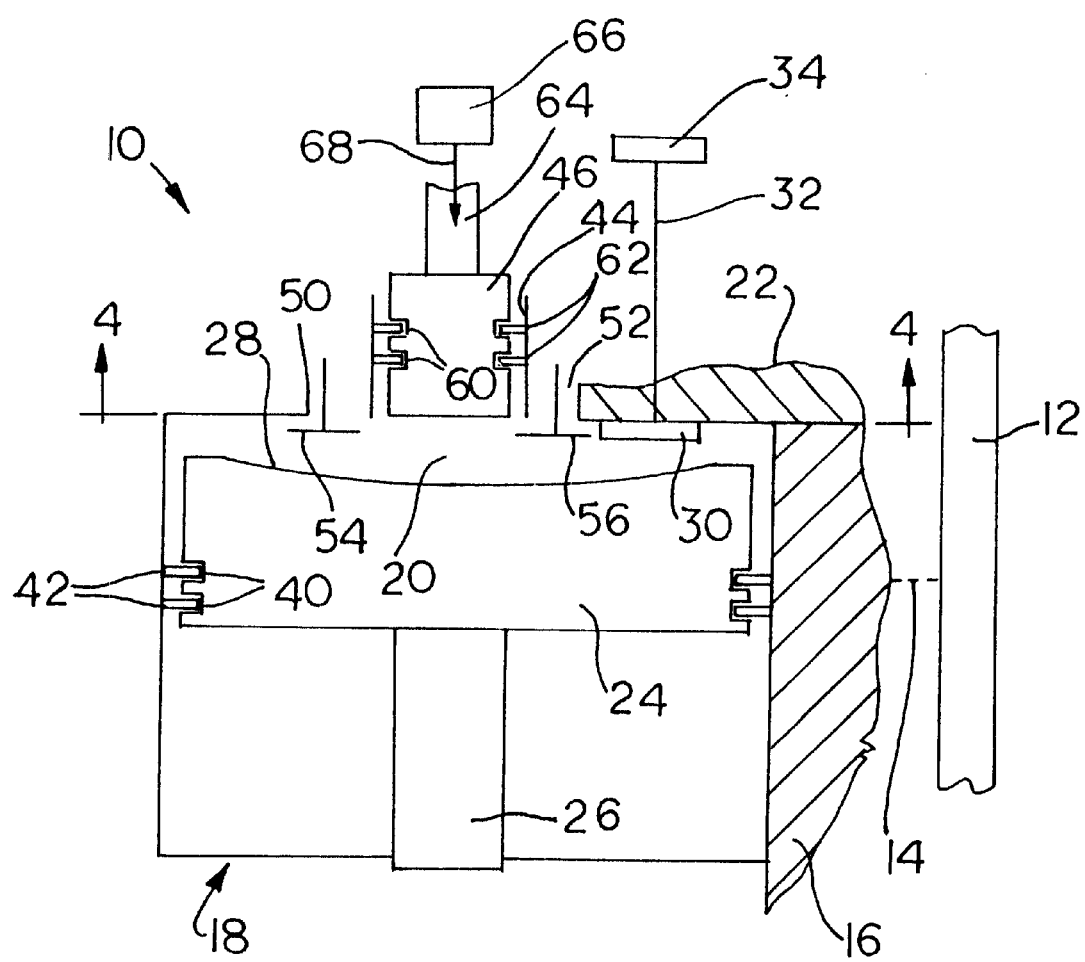
FIG. 1 is a sectional, partially fragmentary view of an embodiment of an internal combustion engine of the present invention within a work machine.
Figure 2:
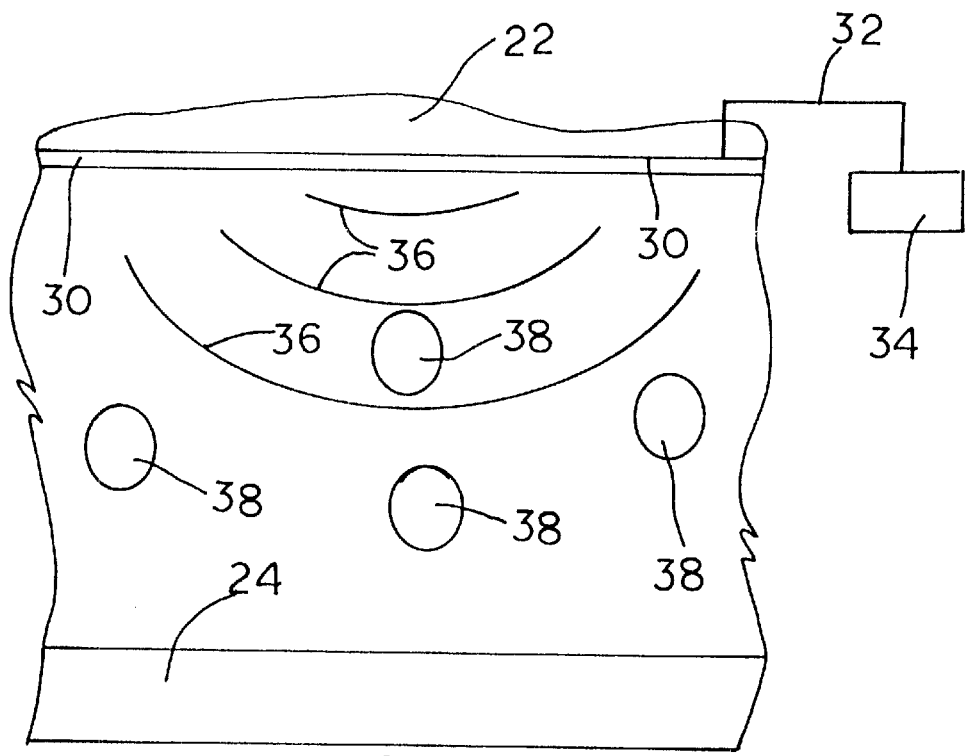
FIG. 2 is an enlarged fragmentary view of a first embodiment of the present invention.

Referring now to the drawings, and more particularly to FIGS. 1 and 2, there is shown an embodiment of an internal combustion engine 10 of the present invention which is incorporated within a work machine such as an onroad vehicle, off-road vehicle, tractor, excavator or the like. The work machine includes a frame 12 that carries internal combustion engine 10, as designated schematically by phantom line 14.

Engine 10 includes an engine block 16 that defines one or more combustion cylinders 18, and typically defines a plurality of combustion cylinders 18, each having a combustion chamber 20 therein. While in most applications of the present invention, engine 10 will include a plurality of cylinders 18, for purposes of simplicity, only one such cylinder 18 is shown in the drawings. Preferably, combustion cylinder 18 is operated under homogeneous charge compression principles, which those skilled in the art will understand.

A cylinder head 22 is provided on block 16, above all combustion cylinders 18. A primary piston 24 is reciprocally disposed within combustion cylinder 18, and movable between a top dead center position adjacent cylinder head 22 (as shown in FIG. 1) and a bottom dead center position at an opposing end of combustion cylinder 18. Primary piston 24 includes a rod 26 coupled therewith on a side opposite from head 22.

Primary piston 24 also includes a crown 28 having a predefined contour that assists in mixing the fuel and air mixture that is introduced into combustion cylinder 18. The particular contour of crown 28 may vary, depending on the particular application.

Figure 3:
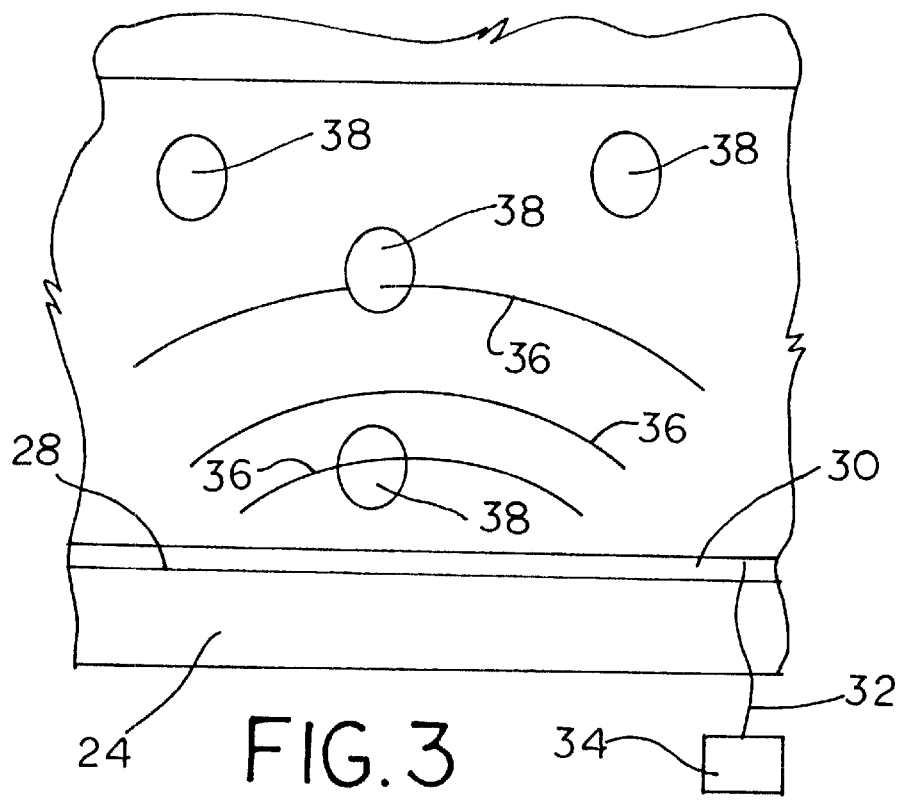
FIG. 3 is an enlarged fragmentary view of a second embodiment of the present invention.

In accordance with the present invention, combustion cylinder 18 is provided with a piezoelectric oscillator 30. A conductor 32 is connected between piezoelectric oscillator 30 and a voltage source 34. Piezoelectric oscillator 30 may be variously positioned in combustion cylinder 18, to emit ultrasonic pressure waves 36 (FIGS. 2 and 3) in combustion chamber 20, to cause breakup of fuel droplets 38. In the embodiment shown in FIG. 1 and FIG. 2, piezoelectric oscillator 30 is mounted on an internal surface of cylinder head 22. Alternatively, as shown in FIG. 3, piezoelectric oscillator 30 can be mounted on crown 28 of primary piston 24.

Primary piston 24 also includes one or more annular piston ring grooves 40 in the exterior periphery thereof, which each carry a respective piston ring 42. Piston rings 42 prevent blow-by of combustion products during a combustion cycle, as is known. Primary piston 24 may also be configured without piston ring grooves 40 and piston rings 42, depending upon the particular application.

In a preferred embodiment of engine 10 for operation under HCCI principles, cylinder head 22 includes a secondary cylinder 44 that is in communication with HCCI combustion cylinder 18. A secondary piston 46 is reciprocally disposed in secondary cylinder 44. Head 22 also includes one or more intake port 50 and one or more exhaust port 52, each having a corresponding intake valve 54 or exhaust valve 56 reciprocally disposed therein. Intake valves 54 and exhaust valves 56 are actuated in known manner during operation of internal combustion engine 10, as primary piston 24 reciprocates between a top dead center position and a bottom dead center position, and vice versa.

Secondary cylinder 44 has a generally cylindrical shape in the embodiment shown, and preferably is positioned generally concentrically with combustion cylinder 18 and primary piston 24. However, it is also possible to position secondary cylinder 44 offset relative to a longitudinal axis of primary piston 24, depending upon the particular application. Regardless, secondary cylinder 44 is positioned adjacent combustion cylinder 18, so as to affect the fluid dynamics of the fuel and air mixture during the combustion process when primary piston 24 is at or near a top dead center position, as shown in FIG. 1.

Secondary piston 46 includes a pair of piston ring grooves 60 that respectively carry a pair of piston rings 62. Piston rings 62 are configured to inhibit blow-by of combustion products during combustion of the fuel and air mixture within combustion cylinder 18. A rod 64 is coupled with secondary piston 46, and is directly or indirectly coupled with an actuator 66 as indicated by line 68. Secondary piston 46 is reciprocated within secondary cylinder 44 to affect the combustion timing of the fuel and air mixture within combustion cylinder 18, as primary piston 24 reciprocates between a compression stroke and a return stroke within combustion cylinder 18.

Actuator 66 controls the reciprocating position of secondary piston 46, depending upon a position of primary piston 24. Actuator 66 may be configured as a cam actuator or a hydraulic actuator, depending upon the particular application. When configured as a cam actuator, the cam is configured to cause secondary piston 46 to remain, or "hang", at the top dead center position for a predetermined period of time.

As indicated above, actuator 66 may also be configured as a hydraulic actuator. When configured as a hydraulic actuator, rod 64 thus acts as a plunger shaft for reciprocating secondary piston 46 between a top dead center position and a bottom dead center position. When configured as a hydraulic actuator, it will be appreciated that secondary piston 46 may be moved to or through any desired location within secondary cylinder 44. Thus, the top dead center position and bottom dead center position of secondary piston 46 may vary. By varying the top dead center position of secondary piston 46, the effective compression ratio of primary piston 24 and combustion chamber 18 may likewise be varied.

In the embodiment shown in FIG. 1, secondary piston 46 and secondary cylinder 44 each have a generally cylindrical shape (i.e., generally circular cross-sectional shape). However, depending upon the particular application, it may also be possible to configure secondary piston 46 and secondary cylinder 44 with a different cross-sectional shape while still allowing effective reciprocation of the secondary piston within the secondary cylinder.

INDUSTRIAL APPLICABILITY

During operation of engine 10 under HCCI concepts, primary piston 24 is reciprocated within combustion cylinder 18, between a bottom dead center position and a top dead center position as shown in FIG. 1, and vice versa. As primary piston 24 moves from the bottom dead center position to the top dead center position, intake valves 54 are actuated to draw in combustion air and/or an air and fuel mixture. A separate fuel injector (not shown) may also be provided, to introduce fuel droplets 38 into combustion chamber 20.

As fuel enters combustion cylinder 18, an electrical current from voltage source 34 is transmitted via conductor 32 to piezoelectric oscillator 30. In known manner, ultrasonic pressure waves 36 are generated and flow through combustion chamber 20 in combustion cylinder 18. As ultrasonic waves 36 encounter fuel droplets 38, the pressure waves generate significant surface instabilities in droplet 38, enhancing breakup of droplet 38, rapid dispersal of fuel and mixing of fuel and air. Since the breakup of droplets 38 is enhanced, the formation of more fuel droplets of smaller size results.

Preferably, the treatment of the fuel in combustion cylinder 18 with ultrasonic pressure waves 36 occurs early in the compression cycle, immediately after the fuel is introduced into combustion cylinder 18. At this early stage, when the fuel has not yet vaporized, breakup of fuel droplets 38 can be enhanced. After a time sufficient to achieve the desired level of fragmentation of droplets 38, current from source 34 to piezoelectric oscillator 30 can be interrupted until the start of the next fuel introduction cycle.

When primary piston 24 is at or near the top dead center position, and preferably shortly before the top dead center position, secondary piston 46 is likewise actuated and moved to the top dead center position adjacent combustion cylinder 18. This effectively causes a rapid decrease in the combined volumes combustion cylinder 18 and its associated secondary cylinder 44, causing rapid compression of the air/fuel mixture. Sufficient energy is imparted to the fuel and air mixture within combustion cylinder 18 or 20 to cause the fuel and air mixture to combust. Secondary piston 46 is preferably held at the top dead center position for a predetermined period of time to maintain the total volume at a minimum. When actuator 24 is constructed as a cam actuator, this is accomplished through a flat cam profile over a portion of the cam actuator. When configured as a hydraulic actuator, secondary piston 46 is simply held at the top dead center position by applying sufficient hydraulic pressure to rod 64.

After combustion, primary piston 24 is moved from the top dead center position toward the bottom dead center position. Secondary piston 46 is concurrently moved toward its bottom dead center position to effectively increase the total communicating volume area. In the case of a hydraulic actuator 24, the bottom dead center position of secondary piston 46 may also be varied to in turn vary the compression ratio of internal combustion engine 10. The process repeats for each cycle of primary piston 24 between the bottom dead center position and top dead center position, and vice versa.

As primary piston 24 moves toward the bottom dead center position, exhaust valves 56 are actuated to allow exhaust gas to exit from the combustion chamber 20 within combustion cylinder 18.

Operation of an engine 10 in accordance with the present invention is fuel independent, and any conventional fuel for internal combustion engines can be used. The use of a piezoelectric oscillator in the combustion chamber enhances fuel droplet breakup to provide an intimate mixture of tiny fuel droplets and combustion air, to promote operation under HCCI combustion cycle principles.

Other aspects, objects and advantages of this invention can be obtained from a study of the drawings, the disclosure and the appended claims.

What is claimed is:

1. An internal combustion engine comprising:
   an engine block defining therein a combustion cylinder;
   a primary piston disposed in said combustion cylinder;
   a cylinder head defining an end of said combustion cylinder; and
   a piezoelectric oscillator disposed in said cylinder, said piezoelectric oscillator connected to a voltage source.

2. The engine of claim 1, said primary piston including a crown on the top thereof, and said piezoelectric oscillator being attached to said crown.

3. The engine of claim 1, said piezoelectric oscillator mounted on said cylinder head.

4. The engine of claim 1, said engine adapted for operation under homogeneous charge compression concepts.

5. The engine of claim 4, said primary piston including a crown on the top thereof, and said piezoelectric oscillator being attached to said crown.

6. The engine of claim 4, said piezoelectric oscillator mounted on said cylinder head.

7. The engine of claim 4, said cylinder head defining a secondary cylinder in flow communication with said combustion cylinder; and a secondary piston reciprocally disposed in said secondary cylinder.

8. The engine of claim 7, said primary piston including a crown on the top thereof, and said piezoelectric oscillator being attached to said crown.

9. The engine of claim 7, said piezoelectric oscillator mounted on said cylinder head.

10. A method for operating an engine, comprising:
    providing a combustion cylinder having a cylinder head at an end thereof and a primary piston reciprocally disposed in the combustion cylinder, defining a combustion chamber;
    providing a piezoelectric oscillator in the combustion chamber;
    introducing fuel into the combustion chamber;
    activating the piezoelectric oscillator and initiating ultrasonic pressure waves through the combustion chamber and the fuel in the combustion chamber;
    dispersing the fuel throughout the combustion chamber; and
    compressing the fuel in the combustion chamber.

11. The method of claim 10, including activating the piezoelectric oscillator before significant compression of the fuel.

12. The method of claim 11, including providing the piezoelectric oscillator disposed on the cylinder head.

13. The method of claim 11, including providing the piezoelectric oscillator on the primary piston.

14. The method of claim 10, including providing the piezoelectric oscillator disposed on the cylinder head.

15. The method of claim 10, including providing the piezoelectric oscillator on the primary piston.

16. The method of claim 10, including:
    providing a secondary cylinder in communication with said combustion chamber, and a secondary piston reciprocally disposed in the secondary cylinder; and
    reciprocating the secondary piston in the secondary cylinder to influence said step of compressing the fuel in the combustion chamber.

17. The method of claim 16, including providing the piezoelectric oscillator disposed on the cylinder head.

18. The method of claim 16, including providing the piezoelectric oscillator on the primary piston.

19. A work machine comprising:
    a machine frame; and
    an engine carried by said machine frame, said engine including:
        an engine block defining therein a combustion cylinder;
        a primary piston disposed in said combustion cylinder;
        a cylinder head defining an end of said combustion cylinder, said cylinder head defining a secondary cylinder in flow communication with said combustion cylinder;
        a secondary piston reciprocally disposed in said secondary cylinder; and
        a piezoelectric oscillator disposed in said combustion chamber, said piezoelectric oscillator connected to a voltage source.

20. The work machine of claim 19, said primary piston including a crown on the top thereof, and said piezoelectric oscillator being attached to said crown.

21. The work machine of claim 19, said piezoelectric oscillator mounted on said cylinder head.

* * * * *